United States Patent [19]

Evans

[11] Patent Number: 5,583,586

[45] Date of Patent: Dec. 10, 1996

[54] MOUNTING SUPPORTS FOR EYEGLASS FRAMES

[76] Inventor: Robert Evans, 1032 N. Beverly Dr., Beverly Hills, Calif. 90210

[21] Appl. No.: 140,900

[22] Filed: Oct. 25, 1993

Related U.S. Application Data

[63] Continuation-in-part of Ser. No. 833,379, Feb. 10, 1992, abandoned.

[51] Int. Cl.$^6$ ............................. G09C 5/02; G02C 5/12
[52] U.S. Cl. ............................. 351/130; 351/41; 351/136
[58] Field of Search ............................. 351/130, 124, 351/125, 158, 118, 119, 91, 136, 41

[56] References Cited

U.S. PATENT DOCUMENTS

| | | | |
|---|---|---|---|
| 1,238,396 | 8/1917 | Elwood | 351/130 |
| 1,285,177 | 11/1918 | Hochstein | 351/118 |
| 3,052,161 | 9/1962 | Berend | 351/118 |
| 3,649,107 | 3/1972 | Hoffmaster et al. | 351/118 |
| 4,986,649 | 1/1991 | Smith | 351/130 |

FOREIGN PATENT DOCUMENTS 2132414  5/1990  Japan ............................. 351/136

Primary Examiner—William L. Sikes
Assistant Examiner—Hung Xuan Dang
Attorney, Agent, or Firm—Michael A. Painter

[57] ABSTRACT

A structure for eyeglass frames which incorporates an improved frontal support assembly and adjustable temples. Left and right ocular frames are interconnected, each being laterally supported by an adjustable temple assembly. To support the eyeglass frames on the user, a pair of upper frontal spacers extend rearwardly from the member interconnecting the ocular frames. The upper frontal spacers are adapted to be placed adjacent the user's brow precluding contact with the nose of the user. Lower frame spacers depend rearwardly from the lower extent of each of the ocular frames and are adapted to be placed adjacent the cheekbones of the user. The upper frontal supports and lower frame supports insure the ocular frames are appropriately spaced from the user's eye while simultaneously preventing the eyeglass frames from slipping or otherwise being inadvertently displaced.

4 Claims, 2 Drawing Sheets

1

MOUNTING SUPPORTS FOR EYEGLASS FRAMES

This application is a continuation-in-part of application Ser. No. 07/833,379, filed Feb. 10, 1992, now abandoned.

BACKGROUND OF THE INVENTION

1. Field of the Invention

The present invention generally relates to eyeglass frames and, in particular, to eyeglass frames incorporating improved frontal support assemblies.

2. Prior Art

The construction of properly fitting eyeglass frames has been the problem which has been sought to be solved for hundreds of years. The fitting of conventional eyeglass frames requires the adaptation of the frames to the individual characteristics of the user. This task is often complicated because individuals differ with respect to differences in eye-to-eye intervals and the widths of the individuals' head and nose bridge. Where eyeglass frames are used to mount corrective lenses, the construction of properly fitting frames is further complicated. Since the lenses must be spaced at a significant distance from the user's eye, the corrective purposes of the lenses must be properly considered when addressing the problems of spacing and supporting the eyeglass frames on the user.

The prior art presents numerous examples of attempts to construct properly fitting and supported eyeglass frames. Conventional eyeglasses employ a binocular support frame which comprises individual ocular frames, each of which support lenses which may or may not be corrective in nature. The ocular frames are generally coupled together medially, the coupling comprising a bow which supports a bridge that rests upon the nose of the user. To complete the support structure, the outer ends of the binocular frame are coupled to right and left temples which extend rearwardly from the binocular frame toward the rear of the head of the user and rest upon the user's ears.

The most common problem inherent in conventional eyeglass frames constitutes the tendency of the eyeglasses to slip downwardly along the nose of the user thereby requiring frequent readjustment. The prior art describes a number of structural variations which have sought to eliminate or reduce the tendency of eyeglasses to become displaced and otherwise slide down along the user's nose. One variation shortens the temples to place a greater compressive force between the nose bridge and the nose of the user. Unfortunately, this results in discomfort to the user, even creating unwanted indentations or blemishes on the nose of the user.

Another form of eyeglass frames described by the prior art replaces the conventional bridge between the ocular frames with a central frontal support which is adapted to rest on the wearer's forehead immediately above the brow of the wearer. The frames utilize a single frontal support which is intended to employ the wearer's brow as a protuberance to support the weight of the eyeglasses. The inadequacies inherent in this structure are obvious. The full weight of the eyeglass frames must be supported by a frontal pad which bears directly against a portion of the wearer's forehead, the angular orientation of which can vary from individual to individual. The greatest problem is that in many cases, the frontal support is disposed directly against a substantially vertical surface. In the absence of a lower supporting member, a single frontal support cannot maintain the necessary stability between the eyeglass frames and the eyes of the user.

The prior art discloses a structure for eyeglass frames which uses aligned support members mounted at the top and bottom of the coupled ocular frames. The frames omit use of ear supported temples. The frames are adapted to be supported above and below the eyes of the wearer. The supports are mounted on the upper and lower edges of the lenses for the purpose of engaging the skin adjacent the eye sockets of the individual. These are problems inherent in this structure. In the absence of temple supports, eyeglass frames constructed in accordance with the prior art require the use of adhesive in order to provide engagement between the supports and the skin of the wearer. Under these conditions, the frames cannot be removed and replaced without requiring replacement of the adhesive, a requirement which severely mitigates effective use.

The present invention substantially resolves the problems exhibited by in those devices defined by the prior art. The eyeglass frames comprise a pair of ocular frames which are joined by a bridge which is displaced from and therefore does not contact the nose of the user. A pair of upper frontal spacers are coupled to the bridge, each being respectively adjacent one of the ocular frames. The upper frontal spacers depend rearwardly from the intersecting bridge and are adapted and engage the brow of the wearer above the nose bridge. The upper frontal spacers insure there is an appropriate separation between the ocular frames and the eyes of the wearer. In addition, the upper frontal spacers engage the brow of the user and partially prevent the frames from sliding downwardly. Lower frame supports are coupled at the bottom of each ocular frame, the lateral interval therebetween being greater than the lateral interval between the upper frontal spacers. The lower frame supports extend rearwardly from the ocular frames and are adapted to rest upon the sloping cheeks of the wearer. To further enhance the proper fit of the present invention eyeglass frames, the lateral extremes of binocular frames are coupled to longitudinally, telescoping temples which can be adjusted to compensate the differences in the shape and size of the wearer's head.

SUMMARY OF THE INVENTION

The present invention comprises a structure for eyeglass frames which includes improved support assemblies. The present invention comprises a binocular frame which employs interconnected left and right ocular frames within which ocular lenses are mounted. The lateral extremes of the binocular frames are coupled to pivotally attached temples, the length of each being individually adjustable. A bow or bridge is used to medially couple the ocular frames. A pair of upper frontal spacers are coupled to the interconnecting bridge, each upper frontal spacer being substantially adjacent a respective one of the ocular frames. The upper frontal spacers are substantially in parallel spaced relation to each other and to the temples, the length thereof insuring a proper fit as well as an appropriate separation between the eyes of the wearer and the ocular frames. Contact pads or other engagement means are secured to the terminus of each of the upper support spacers. The contact pads are adapted to engage the brow of the user to retard displacement between the ocular frames and the eyes of the wearer. A pair of lower frame supports are each mounted at the bottom of a respective ocular frame approximately midway between the upper frontal spacers and the lateral extremes of the ocular frames and extend rearwardly therefrom. Being spaced laterally outwardly from the positions of the upper frontal spacers and in substantial proximity to the lateral extremes of the ocular frames, the lateral interval between the upper frontal spacers. The terminus of each lower frame support is provided with contact pads to engage the sloping cheeks of the wearer and thereby prevent the frames from inadvertent downward movement relative to the eyes of the wearer.

It is therefore an object of the present invention to provide improved eyeglass frames which employ supporting members which do not bear against the nose of the wearer.

It is another object of the present invention to provide improved eyeglass frames which are supported against the face of the wearer both above and below the wearer's eyes.

It is still another object of the present invention to provide improved eyeglass frames which incorporate longitudinally, adjustable temples.

It is still yet another object of the present invention to provide improved eyeglass frames which are simple and inexpensive to fabricate.

The novel features which are believed to be characteristic of the invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

DESCRIPTION OF THE PRESENTLY PREFERRED EMBODIMENT

Figure 1:
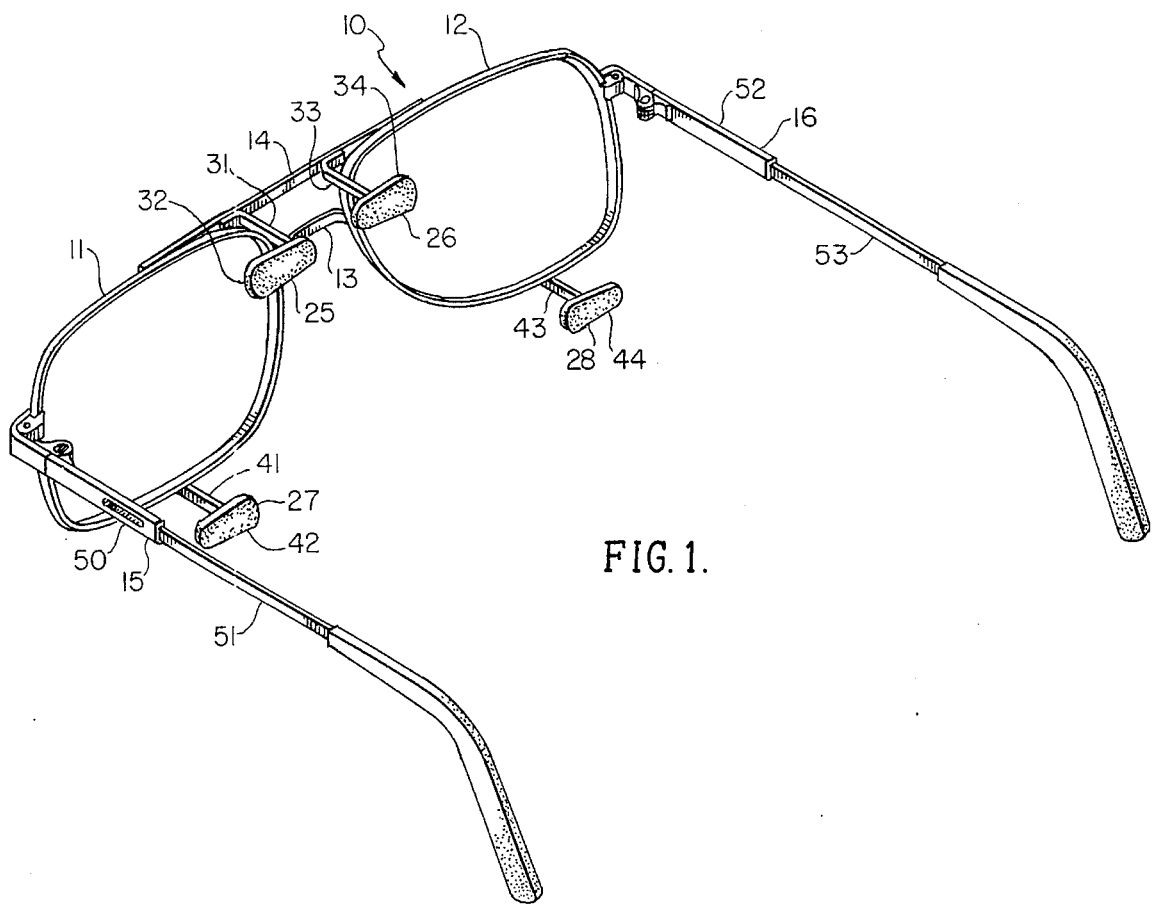
FIG. 1 is a perspective view of eyeglass frames in accordance with the present invention.

The present invention can be best understood by reference to FIG. 1 wherein eyeglass frames constructed in accordance with the present invention are generally designated by the reference numeral 10. Eyeglass frames 10 comprise a pair of ocular frames 11 and 12 which are medially coupled by bridge member 13 and transverse or horizontal support 14. Neither bridge member 13 nor transverse support 14 are in contact the face of the wearer. The lateral extremes of ocular frames 11 and 12 are pivotally coupled to adjustable temples 15 and 16, respectively. To improve the mounting characteristics of the present invention eyeglass frame 10, upper frontal spacers 25 and 26 extend rearwardly from transverse support 14, lower frame supports 27 and 28 being secured to and extending rearwardly from the lower extent of ocular frames 11 and 12, respectively.

Figure 2:
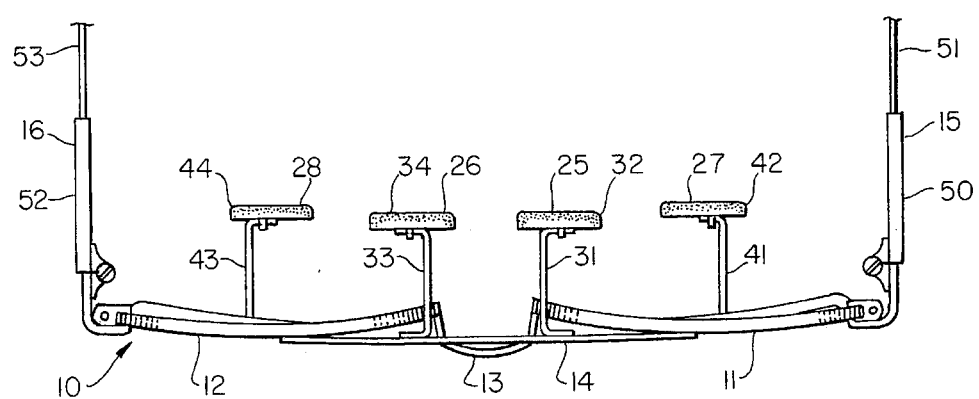
FIG. 2 is a top plan view of the eyeglass frames shown in FIG. 1.
Figure 3:
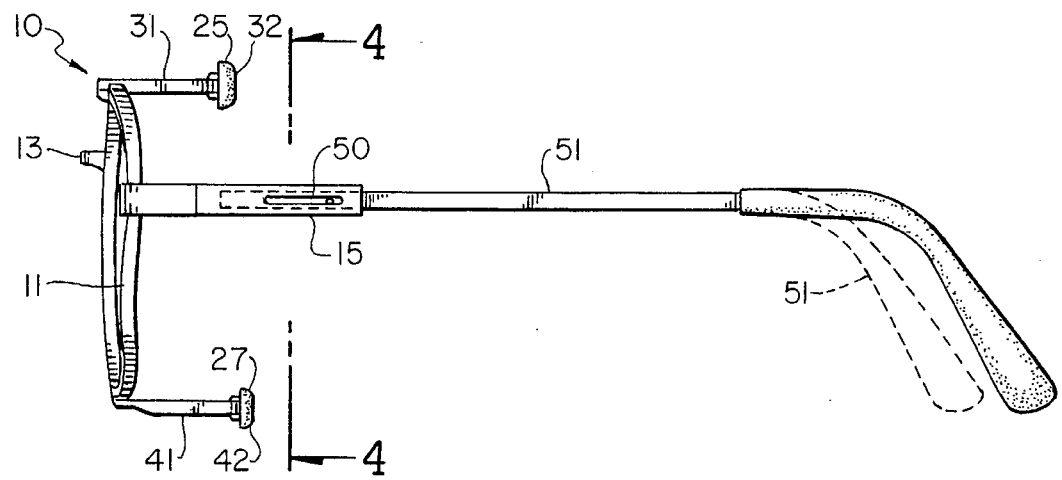
FIG. 3 is a side elevation view of the eyeglass frames shown in FIG. 1 and illustrating the longitudinal adjustment aspect of the temple.
Figure 4:
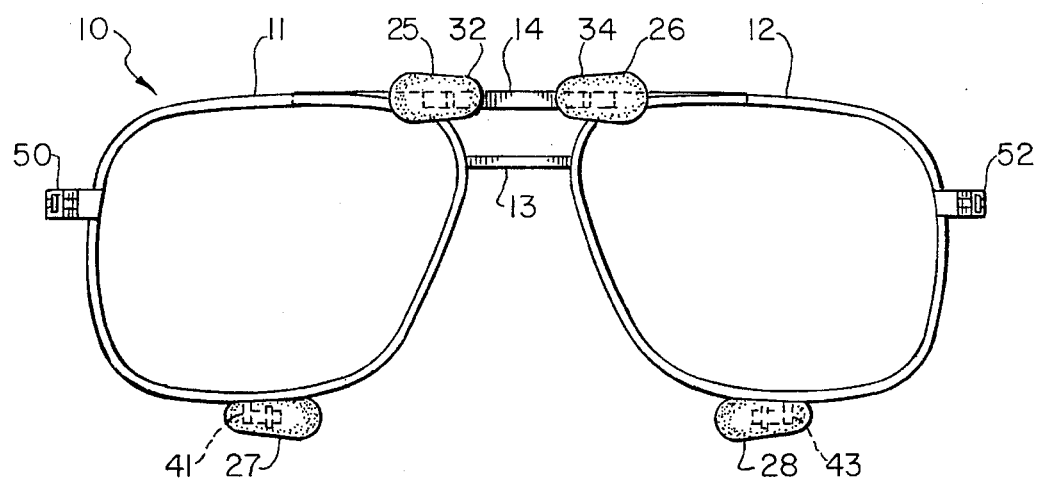
FIG. 4 is a rear elevation view shown in partial cross-section taken through line 4—4 of FIG. 3.

An understanding of the manner in which the present invention eyeglass frames 10 are supported upon and spaced from the face of the user can be best understood by reference to FIGS. 2, 3 and 4. In implementing an objective of the present invention, there is no contact between eyeglass frames 10 and the nose bridge of the user. As can be seen in FIG. 4, ocular frames 11 and 12 are medially coupled to one another by bridge 13 and transverse support member 14. A pair of upper frontal spacers 25 and 26 are secured to transverse support member 14 and extend rearwardly therefrom in parallel spaced relation to each other. Upper frontal spacer 25 is comprised of an extension flange 31 and a contact pad 32 which is substantially perpendicular to flange 31. In a like manner, upper frontal spacer 26 is comprised of extension flange 33 and contact pad 34 which is substantially perpendicular thereto. As will be described in detail hereinbelow, contact pads 32 and 34 of upper frontal spacers 25 and 26, respectively, are adapted to engage the brow of the user above the nose bridge and thereby properly separate ocular frames 11 and 12 from the eyes of the user.

Being adapted to rest upon the sloping cheeks of the user, lower frame supports 27 and 28 augment the supporting force necessary to maintain for stable positioning of eyeglass frames 10. Lower frame support 27 is constructed of an extended supporting flange 41 and an integral contact pad 42 which is substantially perpendicular thereto. In a like manner, lower frame support 28 is constructed of extended supporting flange 43 and integral contact pad 44 which is perpendicular thereto. The medial interconnection coupling ocular frames 11 and 12 bisects the lateral interval between upper frontal spacers 25 and 26 and lower frame supports 27 and 28. As can be best seen in FIG. 2, extension flanges 31 and 33 are secured to and extend rearwardly from transverse support 14. Since a wearer's brow is forwardly displaced relative to his or her cheeks, the lengths of extended supporting flanges 41 and 43 are greater than the lengths of extension flanges 31 and 33.

Extended supporting flanges 41 and 43 of lower frame supports 27 and 28, respectively, are secured to and extend rearwardly from the approximate mid-point of the bottom portions of ocular frames 11 and 12. As stated, it is an objective of the present invention to avoid any contact between the present invention and the nose of the user. In the preferred embodiment of the present invention, lower frame supports 27 and 28 are secured to the bottom portions of ocular frames 11 and 12 substantially intermediate the position of upper frame supports 25 and 26 and the lateral extremities of ocular frames 11 and 12, respectively. It is to be understood the present invention contemplates securing lower frame supports 27 and 28 to the bottom portions of ocular frames 11 and 12 at any point which will preclude contact between the present invention frames and the nose of the user. Therefore, the objective of the present invention will be met if each of the lower frame supports 27 and 28 are equally secured to the bottom portion of ocular frames 11 and 12 respectively at a location between a point which lies laterally outwardly from upper frame supports 25 and 26 respectively and a location in substantial proximity to the lateral extremes of ocular frames 11 and 12.

As stated, it is an objective of the present invention to provide eyeglass frames having improved support features. To augment the enhanced support provided by upper frontal spacers 25 and 26 and lower frame supports 27 and 28, the present invention eyeglass frames 10 incorporates adjustable temples 15 and 16. Adjustable temples 15 and 16 are pivotally coupled to ocular frames 11 and 12, respectively, at the lateral extremes thereof. As can be best seen by FIG. 3 and FIG. 4, adjustable temple 15 comprises a front tubular portion 50 within which rear earpiece 51 is slidably coupled and extends longitudinally therefrom. In a like manner, adjustable temple 16 is constructed of front tubular portion 52 within which is slidably coupled rear earpiece 53 which extends longitudinally therefrom. Rear earpieces 51 and 53 are slidably coupled within front tubular portions 50 and 52, respectively, by conventional means which are well known in the art. As exhibited in phantom, rear earpieces 51 and 53 can be slidably placed in alternative longitudinal positions relative to front tubular portions 50 and 52.

The present invention is a structure for eyeglass frames which improves the ability to use the eyeglass frames without the bothersome movement inherent in those devices disclosed by the prior art. When in place, upper frontal spacers 25 and 26 will be engaged with the brow of the wearer above the nose bridge. Since there is no contact with the bridge of the user, the compressive force inherent in conventional eyeglass frames is eliminated. Eyeglass frames 10 are further supported by the engagement between lower frame supports 27 and 28 at the cheeks of the user. The inherent sloping of the user's cheeks will provide the upwardly directed force necessary to prevent the eyeglass frames 10 from inadvertent movement. Lastly, to refine the fit of the eyeglass frames to the individual user, the longitudinal lengths of adjustable temples 15 and 16 are adapted to be positioned to compensate for the distance between ocular frames 11 and 12 and the ears of the user.

I claim:

1. An improved apparatus for mounting eyeglass lenses substantially adjacent the eyes of a wearer comprising:

(a) first and second ocular frames having upper and lower sections;

(b) a bridge medically coupling said first and second ocular frames;

(c) first and second adjustable temples pivotally coupled to the lateral extremes of said first and second ocular frames respectively, said first and second temples each comprising a front tubular portion and a rear eyepiece, said rear eyepiece including a linear member which is slidably disposed within said front tubular portion and which extends longitudinally therefrom;

(d) first and second upper frontal spacers each comprising an extension flange secured to said bridge adjacent said first and second ocular frames respectively and extending rearwardly therefrom in parallel spaced relation to each other, and first and second contact pads mounted upon the ends of said first and second extension flanges opposite said ocular frames; and (e) first and second lower frame supports each comprising a supporting flange secured to the lower section of said first and second ocular frames respectively and extending rearwardly therefrom in parallel spaced relation to each other, and first and second contact pads being mounted upon the ends of said first and second supporting flanges respectively opposite said ocular frames, the lengths of said first and second supporting flanges being greater than the lengths of said first and second extension flanges.

2. Apparatus for mounting eyeglass lenses substantially adjacent the eyes of a wearer comprising:

(a) first and second ocular frames having upper and lower sections;

(b) a bridge medially coupling said first and second ocular frames;

(c) first and second temples pivotally coupled to the lateral extremes of said first and second ocular frames respectively and extending rearwardly therefrom;

(d) first and second upper frontal spacers each comprising an extension flange secured perpendicular to said bridge adjacent said first and second ocular frames respectively and extending rearwardly therefrom in parallel spaced relation to each other, and contact pads mounted upon said extension flanges opposite said ocular frames; and (e) first and second lower frame supports secured to the lower sections of said first and second ocular frames each being spaced laterally outwardly from the coupling between said bridge and said first and second ocular frames and being in proximity to the lateral extremes of said first and second ocular frames respectively, each of said first and second lower frame supports comprising a supporting flange extending rearwardly from the lower section of said ocular frame and a contact pad mounted upon the support flange opposite said ocular frame, said support flanges being in parallel spaced relation to each other, the distance between the supporting flanges of said first and second lower frame supports being greater than the distance between the extension flanges of said first and second upper frontal spacers, the distance between the contact pads of said lower frame supports and the ocular frames being greater than the distance between the contact pads of said upper frontal spacers and the ocular frames.

3. An apparatus for mounting eyeglass lenses as defined in claim 2 wherein said first and second temples each comprise a front tubular portion and a rear earpiece, said rear earpiece including a linear member which is slidably disposed within said front tubular portion and which extends longitudinally therefrom.

4. Apparatus for mounting eyeglass lenses substantially adjacent the eyes of a wearer comprising:

(a) first and second ocular frames having upper and lower sections;

(b) a bridge medially coupling said first and second ocular frames;

(c) first and second temples pivotally coupled to the lateral extremes of said first and second ocular frames respectively and extending rearwardly therefrom;

(d) first and second upper frontal spacers each comprising an extension flange secured perpendicularly to said bridge adjacent said first and second upper frames respectively and extending rearwardly therefrom in parallel spaced relation to each other, and contact pads mounted upon each of said extension flanges opposite said ocular frames; and (e) first and second lower frame supports secured to the lower sections of said first and second ocular frames substantially intermediate the coupling between said bridge and said first and second ocular frames and the lateral extremes of said first and second ocular frames respectively, each of said first and second lower frame supports comprising a supporting flange extending rearwardly from the lower section of said ocular frame and a contact pad mounted upon the support flange opposite said ocular frame, said support flanges being in parallel spaced relation to each other, the distance bstween the supporting flanges of said first and second lower frame supports being greater than the distance between the extension flanges of said first and second upper frontal spacers, the distance between the contact pads of said lower frame supports and the ocular frames being greater than the distance between the contact pads of said upper frontal spacers and the ocular frames.

* * * * *